3,031,468
METHYL ETHER OF (+)-16,16-DIFLUOROEQUILIN AND ITS PREPARATION

Leslie G. Humber, Dorval, Quebec, and Michael Kraml, Montreal, Quebec, Canada, assignors to American Home Products Corporation, New York, N.Y., a corporation of Delaware
No Drawing. Filed July 27, 1961, Ser. No. 127,131
3 Claims. (Cl. 260—397.4)

This invention relates to a new chemical compound, (+)-16,16-difluoroequilin methyl ether, and to its preparation from available starting materials.

Our new chemical compound, a steroid, has the formula:

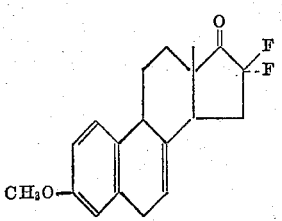

It may be readily prepared in two stepus from (+)-equilin methyl ether. This starting material is treated with ethyl formate in a step which is a modification of the method of Bardhan [J.C.S. (London), 1936, page 1848], to yield (+)-16-hydroxymethylene equilin methyl ether. The latter compound, in turn, is reacted with perchloryl fluoride in the presence of potassium t-butoxide, following the procedure described by Robinson et al. [J.A.C.S. 82, page 5256 (1960)], to yield the desired new chemical compound.

This series of chemical reactions may be represented as follows:

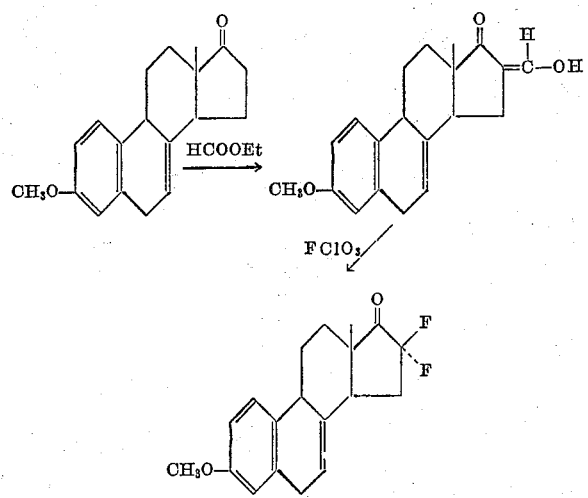

Our new chemical compound is a valuable inhibitor of cholesterol biosynthesis. This property has now been recognized as being of great potential value in the treatment of atherosclerosis both in animals and in human beings. Animals, in the treatment of which the compound has potential value, include small pets and larger animals, such as horses, especially race horses which are kept for stud purposes.

Our new compound is also a valuable intermediate in the preparation of steroids wherein fluorine groups are present in the 16-position and of steroids containing double bonds in positions analogous to those in which they are present in (+)-16,16-difluoroequilin methyl ether, or of steroids the synthesis of which requires such groupings. Thus, the compound may be transformed by partial hydrogenation into the corresponding derivative of estrone, a cholesterol-lowering agent, as disclosed by the Robinson et al., article cited above.

At a concentration of $10^{-3}$ M, (+)-16,16-difluoroequilin methyl ether causes a 97 percent inhibition of incorporation of mevalonate-2-$C^{14}$ into cholesterol.

The following examples are illustrative of our invention.

EXAMPLE 1

*(+)-16-Hydroxymethylene-Equilin Methyl Ether*

A mixture of (+)-equilin methyl ether (21 g.), ethyl formate (49 ml.) and sodium methoxide (from 3.5 g. of sodium), were refluxed in a 1:1 mixture of benzene:ether for two and one-half hours, then allowed to stir at room temperature for twelve hours. Filtration yielded the sodium salt of (+)-16-hydroxymethylene-equilin methyl ether as a gel-like solid. It was suspended in a mixture of methylene chloride and water and acidified with 5 percent hydrochloric acid. The methylene chloride layer was separated, washed with water, dried, and evaporated, to yield 22 g. of an orange-colored oil which, by treating with methanol, yielded 10 g. of a white crystalline substance. On further crystallization from methylene chloride-methanol, this crystalline material had a melting point of 178–180° C.; $[\alpha]_D$ ($CHCl_3$):+247.0°.

Analysis confirmed the empiric formula $C_{20}H_{22}O_3$. Required: C, 77.40%; H, 7.14%. Found: C, 76.85%; H, 7.06%.

EXAMPLE 2

*(+)-16,16-Difluoroequilin Methyl Ether*

(+)-16-Hydroxymethylene-equilin methyl ether (9.0 g.) was dissolved in t-butanol containing potassium t-butoxide. Into this mixture perchloryl fluoride was bubbled for sixteen minutes. During this period three additional portions of potassium t-butoxide were added. At the end of the reaction the butanol was removed by exaporation in vacuo, and the residue was distributed between water and chloroform. The chloroform layer was washed with water, dried, and evaporated to yield the product (+)-16,16-difluoroequilin methyl ether as an orange-colored solid. It was chromatographed on alumina. Elution with 1:1 benzene:chloroform yielded 3 g. of (+)-16,16-difluoroequilin methyl ether in purified form. A sample was sublimed for analysis. It had a melting point of 172–176° C.; $[\alpha]_D(CHCl_3)+192.4°$.

Analysis confirmed the empiric formula $C_{19}H_{20}O_2F_2$. Required: F, 11.94%. Found: F, 11.91; 12.01%.

We claim:
1. The compound (+)-16,16-difluoroequilin methyl ether.
2. The process of preparing (+)-16,16-difluoroequilin methyl ether which comprises heating (+)-equilin methyl ether and ethyl formate to secure (+)-16-hydroxymethylene-equilin methyl ether; and treating said latter compound with perchloryl fluoride in the presence of potassium t-butoxide, thereby securing (+)-16,16-difluoroequilin methyl ether.
3. The process of preparing (+)-16,16-difluoroequilin methyl ether which comprises refluxing a mixture of (+)-equilin methyl ether, ethyl formate and sodium methoxide; allowing said reaction mixture to cool; filtering said reaction mixture, thereby recovering a solid product; acidfying said product, thereby securing (+)-16-hydroxymethylene-equilin methyl ether; and subjecting said (+)-16-hydroxymethylene-equilin methyl ether to the action of perchloryl fluoride in the presence of potassium t-butoxide, thereby securing (+)-16,16-difluoroequilin methyl ether.

No references cited.